March 7, 1950

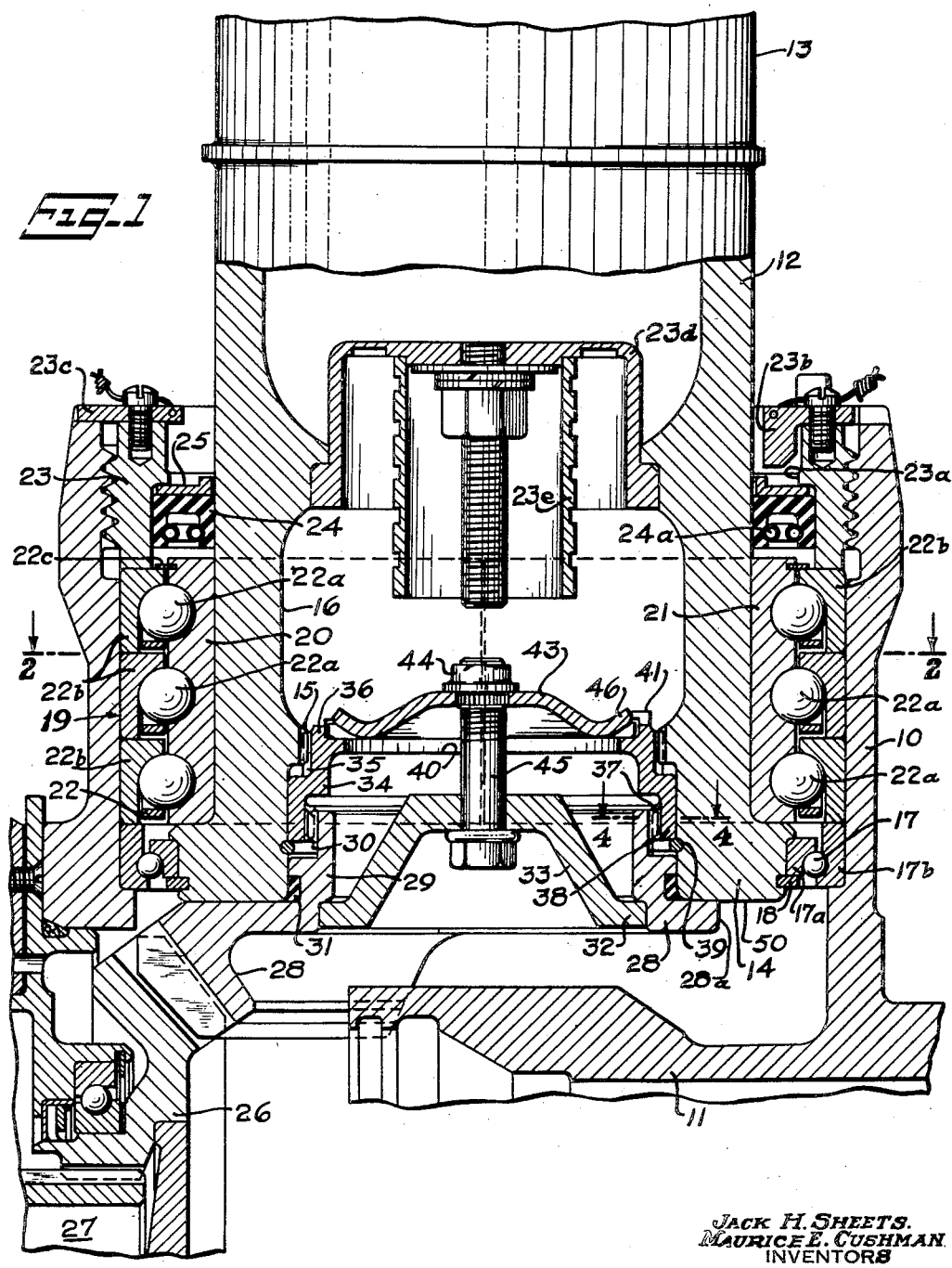

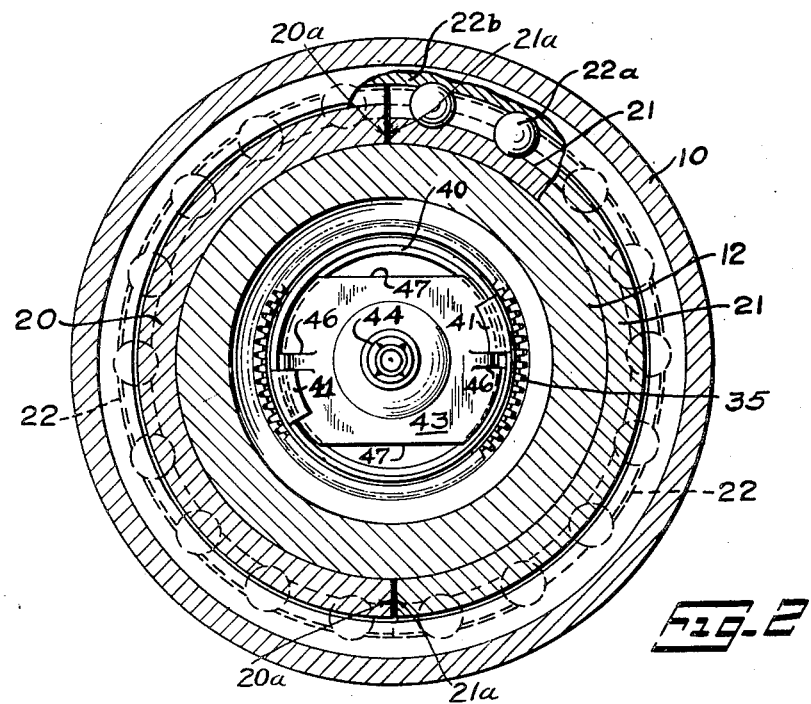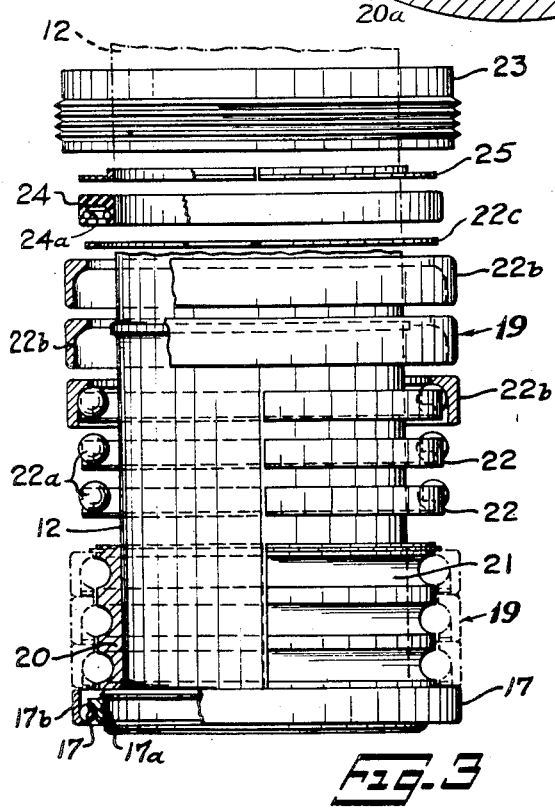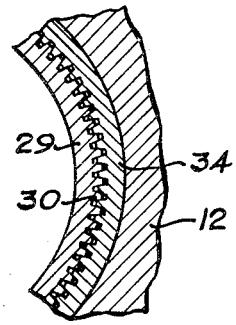

J. H. SHEETS ET AL 2,499,837

PROPELLER BLADE AND THE ART OF
ASSEMBLING A BEARING THEREON

Filed Jan. 19, 1944

JACK H. SHEETS.
MAURICE E. CUSHMAN.
INVENTORS

BY

ATTORNEY

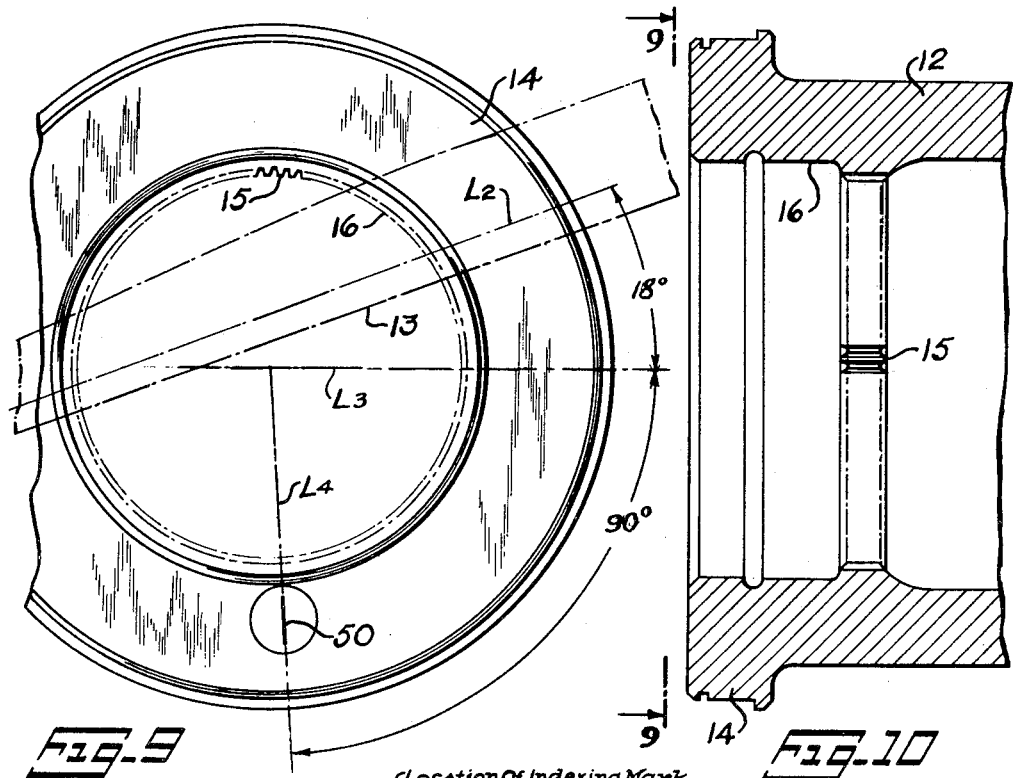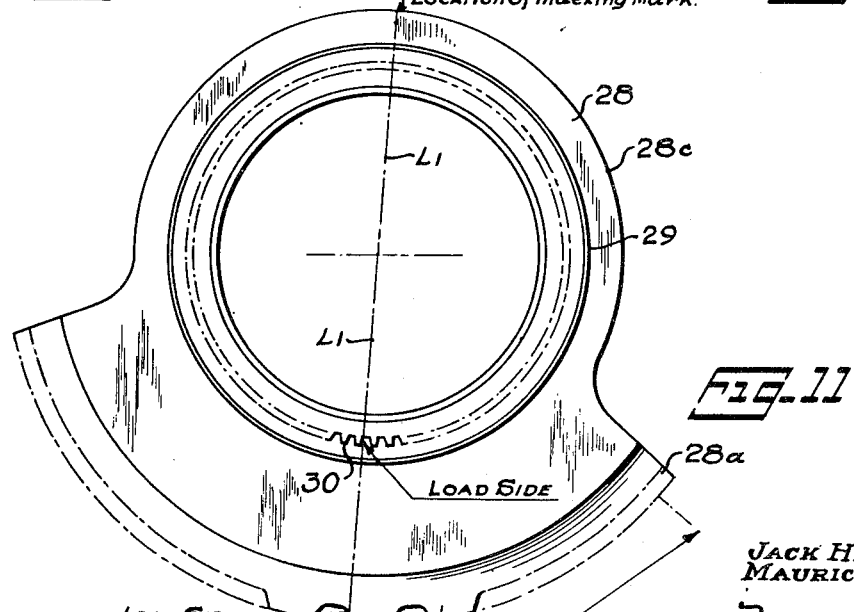

Patented Mar. 7, 1950

2,499,837

UNITED STATES PATENT OFFICE 2,499,837

PROPELLER BLADE AND THE ART OF ASSEMBLING A BEARING THEREON

Jack H. Sheets and Maurice E. Cushman, Verona, N. J., assignors to Curtiss-Wright Corporation, a corporation of Delaware Application January 19, 1944, Serial No. 519,064

2 Claims. (Cl. 170—160.58)

This invention relates to aircraft propellers and more particularly to such propellers wherein the blades thereof are associated with a controllable pitch change mechanism.

More specifically, the invention resides in a structural improvement in the root or shank end portion of the blades of such propellers whereby an integral flange and a blade index-coupling means may be incorporated therewith.

In some types of propeller assemblies, the shank end of each blade is journalled in the propeller hub by means comprising a plurality or stack of annular, anti-friction bearings of the one-piece ball race type, a flanged, screwthreaded retaining member and a threaded, locking ring or blade-retaining nut.

This construction requires that the outer diametral surface of the blade shank be uniform throughout for the passage thereover of the said anti-friction bearings. In the assembly of the aforesaid elements, the locking nut is first passed over the shank of the blade, then the stack of bearings, and finally the flanged retaining member or plug including a blade actuating gear segment, screw threaded into the root end of the blade and secured against movement as by means of a dowel pin.

The foregoing known construction has certain disadvantages in that it increases the weight of the blade assembly unnecessarily, entails more costly manufacturing operations such as thread cutting, for example, and does not provide a positive safety factor for the reason that should the flanged plug become disconnected from the blade, while in operation, the blade would be free to become detached from the propeller hub. Moreover, in regions where screw threads occur, a severe stress concentration factor in such regions may cause fractures and failure of a particular part or parts in the propeller assembly.

The present invention not only obviates the above noted disadvantages but it also frees space within the root end portion of the blade, formerly occupied by the flanged retaining plug as hereinbefore noted, for the formation on the interior, and the reception within the blade shank, of a blade index-coupling means including the hub of a blade actuating gear segment.

Accordingly, it is an object of the invention to provide a novel propeller blade assembly which is lighter in weight, provides a positive safety factor, requires a minimum of manufacturing operations and therefore is less expensive to manufacture.

A further object of the invention is to provide a propeller assembly wherein each blade is adapted to be indexed for concise angularity whereby aerodynamic balance of all the blades is more readily achieved.

Another object of the invention is to provide a propeller blade with a novel shank end construction whereby a plurality of blade index-coupling elements including a blade actuating gear segment may be associated therewith.

A further object of the invention is to provide a propeller blade with an improved shank end construction whereby an interlocking coupling may be made between the blade and a gear segment adapted for actuating said blade.

Another object of the invention is to provide a propeller blade, as specified, with an improved shank end construction which obviates the necessity for screw threads and what is more important, the prevention of severe stress concentration factors in the shank region of a blade whereby the likelihood of fractures and/or the failure of a part is materially decreased.

A further object of the invention is to provide a propeller blade journalling means wherein the blade is held rigid yet sufficiently free to permit partial rotation about its axis, and which is also held secure against radial movement either inwardly or outwardly with respect to its hub socket.

With the above and other objects in view, the invention resides in the novel construction, combination, and arrangement of parts, the novel features of which are set forth with particularity in the appended claims. The invention itself, however, both as to its organization and its method of operation, together with additional objects and advantages thereof, will be understood from the following description of a specific embodiment, when taken in connection with the accompanying drawings, in which:

Figure 1 is a fragmentary sectional view illustrating the manner in which the improved shank portion of a propeller blade is associated with the blade carrying hub;

Fig. 2 is a transverse sectional view taken on the line 2—2 of Fig. 1;

Fig. 3 is an exploded view in plan and partly in section and illustrating the manner in which the blade-retaining nut and a stack of split bearings are positioned on the shank portion of the improved propeller blade;

Fig. 4 is a fragmentary sectional view taken on the line 4—4 of Fig. 1;

Fig. 9 is an elevational view looking from the line 9—9 of Fig. 10 into the root end of the blade shank and illustrating the angular location of one of the reference marks, shown in Fig. 5, with respect to the chord line of the blade section indicated by the broken lines;

Fig. 10 is a sectional view of the blade shown in Fig. 9; and

Fig. 11 is a top plan view of the gear segment per se illustrating the angular relation of the load side of a spline tooth with respect to the load side of the fifth tooth (counting from the right of the figure) of the gear segment.

Figure 6:
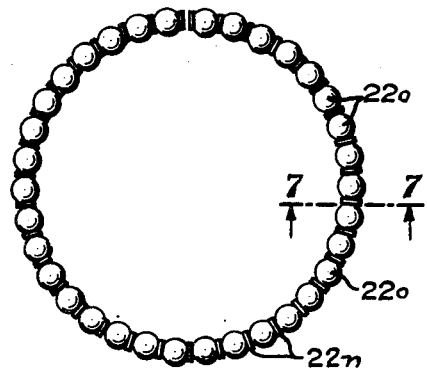
Fig. 6 is a reduced plan view of a flexible, ball-retaining cage.

Referring to the drawings and to Fig. 1 in particular, one of the blade-receiving sockets 10 of a multiple socket propeller hub 11 is shown with the improved shank portion 12 of a hollow blade 13 journalled therein.

In accordance with the invention, the improvements in the blade shank 12 comprise an external flange 14, integral with said shank at the root end thereof, whereby the threading of a bore within the shank portion 12 and the attachment thereto of a flanged screw plug is obviated, said improvements further comprising an inwardly extending flange provided with splines 15 located within the bore 16 and forming one element of an index-coupling means as and for the purpose hereinafter described.

The foregoing improvements, together with the blade index-coupling elements associated with the shank portion 12, will now be described.

The external flange 14 is suitably shouldered to provide a circular flanged seat engaged by an anti-friction bearing 17 which comprises inner and outer ball races 17a and 17b respectively. The bearing 17 is retained on the blade shank flange 14 by a snap ring 18 which occupies an annular groove provided therefor in said flange 14 as clearly shown in Fig. 1.

Disposed around the shank 12 and seated on the flange 14 is an anti-friction main bearing 19 which, in the example shown in Figs. 1 and 3, comprises two accurately matched half-sections or raceway-forming members 20 and 21 with a plurality of spaced, annular raceways formed therein and constituting the inner race of the bearing 19. The aforesaid bearing 19 also comprises a plurality of ball-retaining cages 22 for a plurality of anti-friction ball members 22a, each of said cages, in the preferred example shown, being formed by two duplicate half sections.

Figure 7:
Fig. 7 is a sectional view taken on the line 7—7 of Fig. 6.
Figure 8:
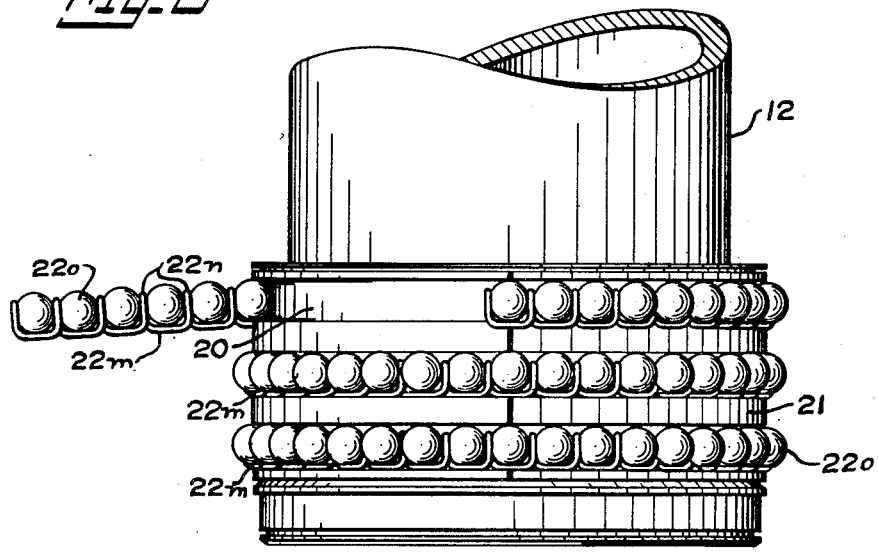
Fig. 8 is an elevational view of the root end of the blade shank illustrating the manner of assembling the flexible, ball - retaining cages thereon.

However, in lieu of the said duplicate half-sections and as shown in Figs. 6, 7 and 8, there may be utilized flexible one-piece ball cages or retainers 22m formed of spring wire and in a manner adapted to present spaced, upstanding loops 22n for retaining a plurality of similar ball members 22o. The aforesaid flexible, one-piece ball cages 22m are positioned in the respective raceways of the inner race sections 20 and 21 much after the fashion of a bracelet with the respective free ends thereof substantially in abutting relation.

Referring further to Figs. 1 and 3, a plurality of outer raceways 22b of the one-piece type, i. e., not split, one for each ball cage 22, complete the bearing 19 with the outer raceways 22b held in stacked relation, as shown by a single-split snap ring 22c disposed in a suitable groove formed in and about the upper end portion of the inner ball race sections 20 and 21.

Associated in threaded relation with the socket 10, at the top thereof, is a blade-retaining ring or nut 23 which engages the uppermost raceway 22b to positively hold the aforesaid parts in assembled relation. A resilient U-shaped seal 24 is maintained in sealing relation with respect to the exterior surface of the shank 12 and the interior surface of the nut 23 by a pair of flexible garter rings 24a. A two-piece metal ring 25, having a short upstanding flange is positioned on top of and held in engagement with the U-shaped seal 24 by a flange 23a formed on the aforesaid nut 23. The split ring 25 serves to reinforce the resilient seal 24 to thereby prevent escape of a lubricant in response to centrifugal force generated during operation of the blade in a propeller assembly. As known in the art, lugs 23b utilizable for blade-balancing purposes together with a key 23c are secured to the upper face of the blade-retaining nut 23 by suitable screws, the lugs 23b and key 23c having short arcuate configuration.

In a known manner, the interior chamber defined by the blade 13 is sealed by a shell 23d which, in suitable manner, has a balance plug 23e secured to its interior surface and projecting inwardly.

For a description of the index-coupling means, reference is to be had to Fig. 1 wherein the hub 11 is shown as enclosing the final gear 26 of a blade-actuating power unit generally indicated at 27, said gear 26 being shown in mesh with a gear segment 28 provided with a shouldered hub 29 having a series of splines 30 about its upper reduced diametral portion.

The hub 29 of the aforesaid gear segment 28 is also provided, on its lowermost exterior surface, with an annular groove adapted for the reception of a suitable gasket 31 of synthetic rubber, for example, which, when the parts are assembled as shown, coacts with the adjacent surface of the bore 16 to form a lubricant seal as will be understood.

The hub 29 of the gear segment 28 is further provided with a counter bore forming a recess for the annular base flange 32 of a truncated cone or plug 33 which is formed preferably, although not necessarily, of Duralumin. The plug 33 is secured within the aforesaid hub 29 preferably by means of a force fit whereby said gear segment and said plug are permanently assembled as a unit.

In addition to the aforesaid splined hub 29, the index-coupling means includes a shouldered sleeve 34 having a series of external splines 35 on its reduced diametral portion 36 and a series of internal splines 37 on the inner periphery of its lowermost portion 38.

As shown, the sleeve 34 is disposed within the shank bore 16 with the external splines 35 thereof in meshed engagement with the splines 15 and with the internal splines 37 thereof in meshed engagement with the splines 30 formed in the hub 29 of the gear segment 28. The sleeve 34 is retained within the shank bore 16 by a snap ring 39 which occupies an annular groove formed in the surface defining said bore 16. The aforesaid sleeve 34 is further provided with an internal flange 40 adjacent the uppermost face thereof together with a pair of oppositely disposed, upstanding lugs 41, Fig. 2, for a purpose hereinafter described.

A dished plate washer 43, a lock nut 44 carried by said washer, and a screw bolt 45 constitute means whereby the foregoing elements are maintained in cooperative relation. The washer 43 is provided with a pair of oppositely disposed tongues 46 struck out from the circular edge portion thereof, as clearly shown in Fig. 2, with the aforesaid lock nut 44, of the type known as an "elastic stop nut," for example, staked, splined or otherwise secured in a central opening provided in said washer, whereby said washer and nut are permanently assembled as a unit. In order, as hereinafter described, for the washer 43 to be passed through the opening defined by the internal flange 40 of the sleeve 34 to the position illustrated in Fig. 1, the washer 43 is cut away at opposite sides thereof as at 47 whereby the necessary clearance is provided.

As shown in Figs. 1 and 2, the internal flange 40 of the sleeve 34 provides a support for the washer 43, oppositely disposed sections of the circular edge portion of the latter being disposed under the respective inwardly extending lugs 41 of the sleeve 34.

In order that the invention will be more clearly understood, the manner of assembling the foregoing elements will now be described, reference being had particularly to Fig. 3.

Assuming that the blade 13 is disposed in a horizontal position on a suitable assembly bench with its bare shank portion 12 in an overhanging position, the blade-retaining nut 23, without the lugs 23b and key 23c, is passed over and well beyond the flanged root end of the shank 12. Thereupon, the seal 24 is manually stretched and, while so held, passed over the bare shank and positioned adjacent the nut 23. Next, the snap ring 22c is passed over the bare shank so as to be located adjacent the seal 24. The bearing 19 is now disposed on the shank 12 by first passing the three one-piece outer ball races 22b over the root end of the shank and well beyond the said root end to a position adjacent the nut 23 and seal 24. The two half-sections 20 and 21, comprising the inner ball race of the bearing 19, are now disposed around the shank 12 with the lowermost faces of said half-sections 20 and 21 abutting the shoulder formed by the external flange 14. Thereupon, one set of half-sections constituting a ball cage 22, or a ball cage 22m, Fig. 6, are disposed around the assembled half-sections 20, 21 of said bearing 19, at the lower end thereof. As soon as this has been done, one of the outer ball races 22b is moved along the shank 12 toward its root end until it is positioned around said half-sections of the ball cage 22 or the ball cage 22n. In a similar manner, the remaining ball cages 22 or 22n and the outer ball races 22b are assembled about said half-sections 20 and 21.

After the uppermost or last outer ball race 22b has been moved downwardly along the shank 12 and over the sections 20 and 21, the aforesaid snap ring 22c is moved along the shank and positioned in an annular groove provided therefor about the upper end portion of the said sections 20 and 21 whereby all three of the outer ball races 22b are held in stacked relation as shown. Thereafter, the bearing 17, previously described, is positioned on the shouldered end portion of the external flange 14 and retained thereon by means of the aforesaid snap ring 18 as will be understood.

In accordance with the invention, the aforesaid assembling operation may be performed by reason of the fact, (1) that the external diameter of the flange 14 is slightly less than the internal diameters of the nut 23 and ball races 22b, respectively, and (2) that the seal 24 is readily stretchable so that it may be passed over said flange 14.

The index-coupling elements hereinbefore described are now positioned in the shank bore 16 in the following manner, reference being had particularly to Fig. 1. The aforesaid splined sleeve 34 is slidably inserted in the shank bore 16 to bring the upper splines 35 thereon into meshed engagement with the splines 15. At this time, the snap ring 39 is sprung into the annular groove provided therefor in the shank bore 16 whereby the sleeve 34 is retained in its proper position.

When the washer 43 is to be disposed in operative position with respect to the aforesaid splined sleeve 34, the bolt 45 is threaded, to some extent, into the lock nut 44. Then, while manually holding the bolt 45, the washer 43 is tilted sufficiently to enable it to be passed through the opening defined by the internal flange 40 of the sleeve 34, this being possible by reason of the fact that opposite sides of the washer 43 have been cut away as previously described. After the washer 43 has been positioned above the flange 40, it is seated on the top surface thereof with its flat edges 47 opposite the respective sleeve lugs 41. Finally, when the washer 43 is seated as described, the bolt 45 is threaded out of the lock nut 44, preparatory to attaching the blade-actuating gear segment 28 to the blade shank 12. In so doing, the washer 43 moves with the bolt 45 until the washer tongues 46 engage the respective lugs 41 (which act as stops) in a position removed approximately 160 degrees from that illustrated in Fig. 2. When engagement is thus effected between the tongues 46 and the respective lugs 41, the bolt 45 may readily be removed from the washer 43. When the washer 43 is positioned as shown in Fig. 2, surfaces thereof are beneath the respective lugs 41 and the latter coact with these washer surfaces to positively retain it in seated position on the flange 40.

The splined hub 29 of the blade-actuating gear segment 28 is now slidably inserted in the shank bore 16 to bring the splines on said hub 29 into meshed engagement with the internal splines of the sleeve 34. As previously described, the cone 33 is permanently associated with the gear segment 28 and consequently it takes the position shown in Fig. 1. Thereupon, the bolt 45 is passed through the opening provided therefor in the cone 33 and threaded into the lock nut 44. Preliminarily, as the threading operation is initiated, the bolt 45 moves the washer 43 into the position shown in Fig. 2 wherein the washer tongues 46 engage the respective lugs 41 in a position the reverse of that described above. In this position, the washer 43 resists further turning movement and, therefore, the bolt 45 may be readily threaded thereinto to positively secure the parts comprising the sleeve 43, the cone 33 and the gear segment 28 in the respective positions thereof shown in Fig. 1.

Figure 5:
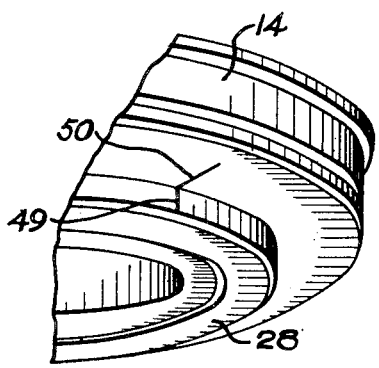
Fig. 5 is a fragmentary plan view illustrating a feature of the invention.

For a description of another feature of the invention, reference is to be had to Fig. 11 in connection with blade design 836–1C2–X as manufactured by Curtiss-Wright Corporation. In Fig. 11, the hereinbefore described gear segment 28 is shown as provided with a segment 28a terminating in spaced gear teeth 28b. As regards the load side, at pitch diameter, of the fifth gear tooth 28b counting from the end of the gear segment at the right, Fig. 11, a line L1 is shown as extending therefrom through the center of said gear segment 28 and terminating at a point on the margin of the gear segment hub which is in line with the location at which a mark 49 is suitably formed on the vertical face 28c of said gear segment hub, Fig. 5.

Further in accordance with the invention, the splines 30 formed exteriorly on the hub 29 of said gear segment 28 are located in a predetermined manner with respect to the aforesaid gear tooth 28b and, hence, with respect to the mark 49. Thus, as shown in Fig. 11, the line L1 determines the location of the load side of one of the splines 30. With this as a basis, all of the splines 30 are spaced equidistantly with respect to each other.

In a conventional manner, as shown in Fig. 9, the blade hub of the above identified blade is shown in elevation, a transverse section at the 54-inch station being shown by the dot-and-dash lines and the chord line being indicated at L2. A line L3 forms an angle of 18 degrees with the line L2. From the center of the blade hub shown in Fig. 9, an arc is struck through an angle of 90 degrees from a vertical projection of the line L3 as indicated to obtain a point which, when connected with said blade hub center by a line L4, defines the location of a mark 50 which is suitably formed on the lower surface of the flange 14, Figs. 5 and 9.

When assemblies including the blade design of the type hereinbefore identified are to be produced, propeller blades 13, gear segments 28 and sleeves 34 are manufactured on a quantity basis. Within the limits imposed by manufacturing operations, all of the blades are duplicates and the same is true with respect to the gear segments and sleeves, respectively. Following the procedure hereinbefore described with respect to Figs. 9 and 11, the flange of each propeller blade has a mark 50 formed thereon and each gear segment hub has a mark 49 formed thereon. Therefore, as regards a group of the blades 13, the respective marks 50 thereon are a part of the duplicate character thereof and the same is true as regards the respective marks 49 of a group of the gear segments 28. Further, with respect to the gear segments 28 and following the procedure hereinbefore outlined, the sets of splines 30 are located in the same manner as regards the respective sets of gear teeth 28b.

Accordingly, during the assembling operation, any sleeve 34 may be selected and disposed in operative position interiorly of a blade shank as hereinbefore described. In so doing, the splines 35 are brought into meshing relation with the splines 15. Thereupon, any gear segment 28 may be selected at random and operatively positioned in the end of the blade shank. In so doing, the splines 30 are caused to mesh with the splines 37. However, this meshing position of the splines last named should be so selected that the marks 49 and 50 are alined as shown in Fig. 2. Finally, while the gear segment 28 is held in the described position, the bolt 45 is passed through the opening provided therefor in the cone 33 and threaded into the lock nut 44 to hold the parts in assembled relation. In this manner, the gear segment 28 is secured to the blade shank by the two sets of splines. Accordingly, for pitch-changing purposes, said gear segment 28 and the propeller blade are rotatively movable as a unit.

In accordance with the invention, there are ninety-four of the splines 15 and the same number of the splines 35 which coact therewith, the splines of the respective sets being equidistantly spaced as will be understood. As regards the splines 30, however, there are ninety-five of these and the same number of the equally spaced splines 37 which coact therewith.

When the gear segment 28 is initially positioned in the end of the blade shank as described above, it is probable that there will be no meshing relation of the splines 30, 37 which would permit the marks 49, 50 to be exactly alined. Accordingly, assuming that the parts are assembled as shown in Fig. 1 wherein a certain relative position exists between the gear segment 28 and the sleeve 34, the bolt 45, gear segment 28 and snap ring 38 may be detached whereupon the sleeve 34 may be retracted to disengage the splines 35 from the splines 15, moved a distance of one of the spline teeth 15 or 35 in one direction and then returned to its splined relation with the splines 15. Thereupon, after the gear segment 28 has been re-associated with the sleeve 34 in the same relative position as referred to above but, with the splines 30, 37 disengaged, said gear segment 28, in a direction the reverse of that described above with respect to the sleeve 34, may be moved a distance of one of the spline teeth 37 and 30 and then returned to its splined relation with the splines 37.

Resulting from the operation just described, a new relative position is established between the gear segment 28 and the blade 13. With the form of the invention herein described, this new relative position is removed approximately 1/25 of one degree from the original relative position between said gear segment 28 and the blade 13. This is true by reason of the fact that the minimum indexing increment of 1/25 of one degree is a function of the difference in angle between the ninety-five splines in the set of splines 30, 37 and the ninety-four splines in the set of splines 15, 35.

Assuming that the described one-spline relative movement was effected between the gear segment 28 and the sleeve 34 in the proper respective directions, the result may be that the marks 49, 50 are brought into exact alinement. If not, the operation described may be repeated as often as necessary to secure the desired result.

It will be understood that the act of assembling the gear segment 28 with the sleeve 34 may cause the mark 49 to be on one side or the other of the mark 50. The direction of the initial one-spline movement of the sleeve 34 will be dependent upon such location of said mark 49 with respect to the mark 50. Obviously, however, the subsequent one-spline movement of the gear segment 28 will be in a direction the reverse of the direction of movement imparted to the sleeve 34.

Resulting from the assembling operation described above, blade assemblies are produced which are duplicates within the limits imposed by manufacturing operations. On each blade assembly, the marks 49, 50 are in alinement and this means that the relation of the blade chord line L2 at the reference blade station to the fifth tooth load side of the gear segment 28 is the same within manufacturing tolerances for all the blade assemblies.

The blade assemblies are now in condition to be assembled with propeller hubs. Accordingly, one of said blade assemblies is inserted in the socket 10 of a hub 11 and, in so doing, the gear teeth 28b of the gear segment 28 come into proper meshing relation with the gear 26. Thereupon, the seal 24 is moved along the shank 12 approximately to its intended position, the two-piece ring 25 is disposed on the upper surface of said seal 24 and the nut 23 is threaded into the socket 10 to the extent necessary to properly clamp the blade in position.

In connection with the foregoing, prior to the time that the nut 23 engages the uppermost raceway 22b, there is slight clearance, as a few thousandths of an inch, between the outer race 17b and the lowermost raceway 22b. Accordingly, when the nut 23 initially engages the uppermost raceway 22b, force is transmitted to the half sections 20, 21 through the three sets of ball members 22a, this force passing from said half sections 20 and 21, through the circular flanged section engaged by the bearing 17, thence through the inner race 17a and finally to the outer race 17b by way of the ball members forming a part of said bearing 17. Thus, the pressure applied by the nut 23 to the bearing half sections 20, 21 preloads the bearings 17 and 19 but, with limited preload deflection, since the outer races 22b of the main bearing 19 are brought to rest upon and are clamped on the exterior race 17b of the bearing 17 after a predetermined amount of deflection takes place in the bearings 17 and 19 to close the aforesaid gap which is initially left between the outer race 17b and the lowermost raceway 22b.

Accordingly, in the manner described, the blade is definitely located and properly secured in its socket. Sideplay or "drooping" of the blade with respect to the bore of the socket is minimized and the blade is prevented from dropping into the hub 11 should it become necessary to remove the power unit 27 and its gear 26. It will further be observed that the bearings 17 and 19 take up a thrust load in opposite directions and that the main bearing 19 takes up the radial thrust exerted by the blade when in operation.

After the blade has been assembled in the socket 10 as described above, the lugs 23b and key 23c are secured to the upper surface of the retaining nut 12 in accordance with conventional balancing procedure.

Assuming that the hereinbefore described hub 11 comprises three radial sockets 10, it will be understood that three of the duplicate blade assemblies of this invention will be disposed and retained in the respective sockets 10 in the manner hereinbefore described to thereby produce a propeller assembly. It is a feature of the invention that each blade, when thus assembled with the hub 11, has the same blade angle as each of the other blades. This condition results from the duplicate character of the blade assemblies and, further, by reason of the fact that, with each blade assembly, the marks 49, 50 are alined as and for the purpose hereinbefore described.

In so far as is known, then, the described three-bladed propeller assembly leaves the factory and goes into service as an aerodynamically balanced unit. In a great majority of cases, this proves to be true. However, in some cases, it becomes apparent in service that the balance is not satisfactory, this fault arising, probably, due to the lack of refined uniformity between apparently duplicate parts as imposed by manufacturing operations.

Accordingly, when in service, should the aerodynamic balance of the propeller prove unsatisfactory as stated, one of the propeller blades may be removed from the socket provided therefor. Thereupon in the same manner as previously described for bringing the marks 49, 50 into alinement, the gear segment 28 and the sleeve 34 are moved in opposite directions to thereby obtain a new relation between said gear segment 28 and the other assembled parts. This is a relatively simple operation and it may be performed, the results checked and then performed again if necessary on one or more of the blades to obtain by trial-and-error procedure a satisfactory condition of aerodynamic balance of the propeller as a unit.

For purposes of explanation, a detailed description has been given concerning a detailed feature of the invention, namely, the two sets of splines. Obviously, the number of splines in the respective sets of splines may differ otherwise than by one spline and, further, there may be as many splines in the respective sets of splines as may be desirable. Further, in lieu of the particular spline arrangement disclosed, there may be utilized other equivalent toothed arrangements such, for example, as the known arrangement involving a pair of members provided, respectively, with different numbers of teeth together with an intermediate toothed coupling member therefor. In the appended claims, the term "splines" shall be interpreted sufficiently broadly to cover such toothed arrangements.

It shall also be understood that our invention, in its broad aspects, is not to be limited to the disclosed procedure for obtaining the location of the marks 49, 50 or equivalent. Obviously, these marks may be located otherwise than as described while still preserving the advantages of the invention. Further, as regards the procedure described, stations other than the 54-inch station may be used as desired.

The balance plug 23e serves as an anchorage for lead or the like whereby the weight of a blade may be increased or, alternatively, decreased for balancing purposes by removing small portions of previously added lead. When an operation of this character is to be effected, the blade is removed from its socket whereupon the bolt 45, the gear segment 28 and washer 43 are disengaged from the assembly in the manner previously described. By way of the passage 40, then, access may be had to the plug 23e for the desired purpose. Thereafter, the parts just named are restored to their respective positions and, if the proper precautions have been observed, the restoration causes the marks 49, 50 to assume the relation taken thereby before disengagement of the parts was effected.

Furthermore, it is to be understood that while the present invention has been described as applicable to a particular type of hollow blade, it is equally applicable to other types of hollow blades and also to solid blades wherein the shank portion may be provided with a bore for the reception of the index-coupling means herein shown and described.

As indicated in Fig. 2, the half-sections or raceway-forming members 20, 21 detachably engage each other at the two sets of surfaces 20a, 21a which are positioned diametrically opposite each other. The half-sections 20 and 21, then, are separate or separable from each other in directions perpendicular to a plane disposed at right angles to the longitudinal axis of the main bearing 19, this plane in the appended claims, being termed "a plane extending transversely of the main bearing." It shall be understood that the half-sections 20, 21 may be so constructed that the sets of surfaces 20a, 21a defining the zones of engagement slant or are angularly related to said plane otherwise than at right angles. It shall also be understood that the members 20, 21 need not be true half-sections and that this inner race of the bearing 19 may be formed from two or more of the members 20, 21 as desired.

In the appended claims, the anti-friction members are designated as of the "ball" type. It shall be understood that this term is generically inclusive of true balls as well as anti-friction members of other shapes.

While the invention has been described with respect to a certain particular preferred example which gives satisfactory results, it will be understood by those skilled in the art after understanding the invention, that various changes and modifications may be made without departing from the spirit and scope of the invention, and it is intended therefore in the appended claims to cover all such changes and modifications.

A divisional application respecting the index coupling has been filed November 6, 1944, under Serial No. 562,167, now Patent 2,460,910, dated February 8, 1949.

What is claimed as new and desired to be secured by Letters Patent is:

1. In combination, a propeller hub having a unitary socket, a propeller blade having a shank and an outwardly projecting integral annular flange at its inner end larger in diameter than said shank and disposed in said socket, means comprising a main bearing for rotatably supporting said propeller blade in said socket, said main bearing comprising externally grooved raceway-forming members fitted to and assembled on said shank outboard of said flange said members being split in an axial direction to enable their assembly around said shank outboard of said integral flange and having an inside diameter substantially equal to the outside diameter of said shank, said main bearing further comprising a plurality of rolling elements engaging said inner raceway-forming members, said main bearing further comprising an outer one-piece annular raceway engaging said rolling elements, the internal diameter of said outer raceway being greater than the external diameter of said flange whereby it may be assembled over said flange prior to assembly of said inner raceway members and said rolling elements, said elements engaging both the outer and inner raceways and holding them from axial movement relative to one another, a bearing abutment within and integral with said socket limiting inward movement of said shank, and a lock ring engaging said outer raceway-forming member and engaging said socket, said lock ring holding said blade shank and said main bearing assembly within said socket against said bearing abutment and said lock ring having an internal diameter greater than the outside diameter of said flange to allow of its assembly over said flange prior to assembly of said main bearing components.

2. In combination, a propeller hub having a unitary socket, a propeller blade having a shank and an outwardly projecting integral annular flange at its inner end larger in diameter than said shank and disposed in said socket, means comprising a main bearing for rotatably supporting said propeller blade in said socket, said main bearing comprising externally grooved raceway-forming members fitted to and assembled on said shank outboard of said flange said members being split in an axial direction to enable their assembly around said shank outboard of said integral flange and having an inside diameter substantially equal to the outside diameter of said shank and having a plurality of annular grooves thereon, said main bearing further comprising a plurality of rows of rolling elements each row engaging a groove of said inner raceway-forming members, said main bearing further comprising a plurality of outer one-piece annular raceways each engaging a row of said rolling elements, the internal diameter of said outer raceways being greater than the external diameter of said flange whereby each may be assembled over said flange prior to assembly of said inner raceway members and said rolling elements, said elements engaging both the outer and inner raceways and holding them from axial movement relative to one another, a bearing abutment within and integral with said socket limiting inward movement of said shank, and a lock ring engaging said outer raceway-forming member and engaging said socket, said lock ring holding said blade shank and said main bearing assembly within said socket against said bearing abutment and said lock ring having an internal diameter greater than the outside diameter of said flange to allow of its assembly over said flange prior to assembly of said main bearing components.

JACK H. SHEETS.
MAURICE E. CUSHMAN.

REFERENCES CITED

The following references are of record in the file of this patent:

UNITED STATES PATENTS

| Number | Name | Date |
|---|---|---|
| Re. 15,345 | Robson | Apr. 25, 1922 |
| 1,884,925 | Vanderbeek | Oct. 25, 1932 |
| 1,928,823 | Young | Oct. 3, 1933 |
| 2,037,251 | Mansson | Apr. 14, 1936 |
| 2,146,440 | Pew | Feb. 7, 1939 |
| 2,153,028 | Schanzer | Apr. 4, 1939 |
| 2,248,590 | Smith | July 8, 1941 |
| 2,269,833 | Upton | Jan. 13, 1942 |
| 2,275,361 | Godfrey | Mar. 3, 1942 |
| 2,315,574 | Anderson | Apr. 6, 1943 |
| 2,372,416 | Fairhurst | Mar. 27, 1945 |
| 2,396,630 | Anderson | Mar. 19, 1946 |
| 2,438,542 | Cushman | Mar. 30, 1948 |
| 2,460,910 | Sheets et al. | Feb. 8, 1949 |

FOREIGN PATENTS

| Number | Country | Date |
|---|---|---|
| 3,140 | Great Britain | Feb. 26, 1915 |
| 546,510 | Great Britain | July 16, 1942 |